United States Patent
Fukuda et al.

(10) Patent No.: US 8,326,664 B2
(45) Date of Patent: Dec. 4, 2012

(54) SYSTEM FOR SUPPORTING CARRY-IN OPERATION PLANNING

(75) Inventors: Yoshibumi Fukuda, Kasama (JP);
Takeshi Yokota, Hitachi (JP);
Kenichirou Yamane, Hitachi (JP); Kenji Akagi, Hitachi (JP); Kensuke Morita, Hitachi (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 0 days.

(21) Appl. No.: 13/151,540

(22) Filed: Jun. 2, 2011

(65) Prior Publication Data
US 2011/0301995 A1 Dec. 8, 2011

(30) Foreign Application Priority Data
Jun. 2, 2010 (JP) .................. 2010-126534

(51) Int. Cl.
*G06Q 10/00* (2006.01)
(52) U.S. Cl. ........................................ 705/7.11
(58) Field of Classification Search .................. 705/7.11
See application file for complete search history.

(56) References Cited

U.S. PATENT DOCUMENTS

| | | | | |
|---|---|---|---|---|
| 8,095,346 B2* | 1/2012 | Fukuda et al. | ..... | 703/6 |
| 2004/0093817 A1* | 5/2004 | Pujol Barcons | ..... | 52/294 |
| 2010/0318465 A1* | 12/2010 | Nielsen et al. | ..... | 705/50 |

FOREIGN PATENT DOCUMENTS

| JP | 2001-249985 | 9/2001 |
|---|---|---|
| JP | 2002-266498 | 9/2002 |

* cited by examiner

*Primary Examiner* — Mark A Fleischer
(74) *Attorney, Agent, or Firm* — Antonelli, Terry, Stout & Kraus, LLP.

(57) ABSTRACT

A carry-in ready period calculation part calculates a candidate of a carry-in ready period which is a period during which a carry-in operation can be conducted and outputs the candidate in an output part so as to make entire construction works efficient. The calculation is performed based on a site arrival time schedule which is a time schedule showing when a carry-in target equipment arrives at a site, a temporary placement time schedule which is a time schedule showing when the equipment arrived is temporarily placed, and a construction time schedule of a building in which the equipment is carried.

5 Claims, 15 Drawing Sheets

FIG.7

| Equipment name | Usage name | 2010/4 | /5 | /6 | /7 | /8 | /9 | /10 | /11 | /12 |
|---|---|---|---|---|---|---|---|---|---|---|
| Equipment 1 | Assembly | | ■■ | ■■ | | | | | | |
| Equipment 2 | Temporary placement | | | | ■■■■■■ | ■■■ | | | | |
| Equipment 3 | Assembly | | | | ■■ | | | | | |
| Equipment 4 | Temporary placement | | | | | ■■■■■■■■■■■ | | | | |
| Equipment 5 | Temporary placement | | | | | | | | ■■■■ | |

Temporary placement period: 2010/7～2010/10

Temporary placement time schedule — 701

FIG.8

| Construction area section name | Category | 2010/4 | /5 | /6 | /7 | /8 | /9 | /10 | /11 | /12 |
|---|---|---|---|---|---|---|---|---|---|---|
| Construction area section 1 | Floor Wall | B1F | | 1F | | | 2F | | | |
| Construction area section 2 | Floor Wall | B1F | | 1F | | | 2F | | | |
| Construction area section 3 | Floor Wall | | B1F | | | 1F | | | 2F | |
| Construction area section 4 | Floor Wall | | B1F | | | 1F | | | 2F | |

Carry-in space available period: 2010/10~2010/11

Construction time schedule —801

SYSTEM FOR SUPPORTING CARRY-IN OPERATION PLANNING

CROSS REFERENCE TO RELATED APPLICATIONS

This application claims the benefit of Japanese Patent Application No. 2010-126534 filed on Jun. 2, 2010, the disclosure of which is incorporated herein by reference.

BACKGROUND OF THE INVENTION

1. Field of the Invention

The present invention relates to a technique of supporting carry-in operation planning in order to efficiently draw up and update a carry-in operation plan of, for example, equipment using heavy machinery such as a crane (which may also be referred to as "carry-in target equipment" hereinafter) in constructing a plant.

2. Description of the Related Art

Along with an increasing demand for power, there have been growing needs for constructing nuclear power stations in many parts of the world. More and more numbers of construction works of nuclear power stations have been thus conducted in many countries. In constructing a large-scale plant such as a power station, various types of works are performed in parallel such as ground preparation of a planned construction site, construction of a building, carry-in and installment of equipment, and piping. Those works are performed based on consensus and directions of different operating bodies in such fields as construction, civil engineering, manufacturing, or the like.

Such a large-scale plant construction undergoes three major stages, namely, designing, procurement, and construction.

Operations performed at the designing stage include designing of a plant building and an interior of the building, layout designing of equipment installed in the interior of the building, setting a carry-in procedure and a carry-in schedule, setting an area for temporarily placing machinery and equipment before being carried in a final position, setting a type or an operable range of heavy machinery for carry-in, or the like. Those operations are performed based on coordination through discussions among the operating bodies.

Next, at the procurement stage, materials, equipment, or the like which have been requested at the designing stage are procured. Procurement works are conducted such that a material is carried in the construction site according to a prescribed carry-in schedule.

Finally, at the construction stage, works using heavy machinery or the like are performed based on the carry-in procedure set at the designing stage. The heavy machinery or the like are operated within the operable range set at the designing stage so as not to cause interference with other operating body's operation.

It is thus important to draw up an efficient and highly accurate work plan at the designing stage in order to reduce a design change at respective stages and facilitate implementation of the entire works. Usually, a person of experience creates such a work plan at the designing stage. Recently, however, a less-experienced person is also required to create an efficient work plan, because a growing demand for plant construction has produced an increased number of work plans to be designed.

In drawing up a plant construction plan for a nuclear power station or the like, at the designing stage, a planner (or an operator) coordinates plural conditions such as a carry-in procedure of equipment into a building using heavy machinery such as a crane, a site arrival time schedule which is a time schedule showing when a carry-in target equipment arrives at a site, a temporary placement time schedule which is a time schedule showing when the equipment arrived is temporarily placed, a construction time schedule of a building as a carry-in target spot in which the equipment is carried, and other relevant time schedules. The coordination of such conditions makes it possible to draw up the most suitable plan for achieving an overall efficiency.

In a plant construction, an operation of carrying an equipment in a building using a crane sometimes has a large influence on the entire construction works. In particular, construction works of a nuclear plant sometimes use a large-sized equipment. A large-sized crane is used for carrying in such large-sized equipment. This means that an area at and around the building necessary for the carry-in operation (which may also be referred to as a "site") may need to be larger and a time required for completing the works may be longer. Therefore, a carry-in operation planning of equipment using a large-sized crane is of great importance in planning a plant construction.

In planning a carry-in operation of equipment using a large-sized crane, coordination with other operation schedules is necessary. A carry-in target equipment is transported from outside of a site and is carried in the site at a site arrival time predetermined in a site arrival time schedule. The carry-in target equipment is temporarily placed in the site until a carry-in operation thereof is started. Such an area for the temporary placement is herein referred to as a "temporary placement area". Other operations are also performed in parallel with the carry-in operation. Thus, the temporary placement area is set aside during a specified time period. In a period other than the prescribed time period, other operation can be performed in the temporary placement area. The temporary placement area is secured according to the temporary placement time schedule.

In carrying the carry-in target equipment in the building using a crane, a carry-in operation is performed based on an assumption that a floor including a carry-in target spot position (which may be simply referred to as a "carry-in target spot") has already been constructed and that a space above the carry-in target spot position is free and open (which is hereinafter referred to as a "carry-in space available state"). Therefore, a person in charge of the planning references a construction time schedule, acquires data on a period during which a carry-in target spot position is in the carry-in space available state, and plans to perform a carry-in operation within the period. Note that, in one plant, dozens of pieces of equipment may be subjected to carry-in operations by a large-sized crane. The planner draws up a carry-in operation plan for each of the equipment.

Japanese Laid-Open Patent Application, Publication. No. 2001-249985 discloses that, in drawing up a carry-in operation plan, an equipment as an operation target and a construction procedure within a specific operation period are determined based on a three-dimensional model representing the equipment and a time schedule in which an operation targeting the equipment is conducted. The three-dimensional model and the construction procedure are separately handled. Thus, even if either one of them is updated, the update does not affect the other. This makes it possible to, for example, even if a time schedule in the construction procedure is updated, reduce influence on the other time schedule in the construction procedure and also reduce workload generated in connection with the update.

Japanese Laid-Open Patent Application, Publication No. 2002-266498 discloses that equipment state data corresponding to a construction process is created based on equipment data concerning equipment arranged in a building frame stored in CAD and construction process data concerning the building. Then the created equipment state data is displayed on a screen or the like. The display makes it possible to confirm a construction state and a work state in accordance with a construction process in time series. Thus, a user can easily know what is going on at a specific time in a given construction process.

As described above, Japanese Laid-Open Patent Application, Publication No. 2001-249985 discloses that the three-dimensional model and the construction procedure are separately handled. Thus, even if either one of them is updated, the update does not affect the other. In the technique, however, if a plurality of construction procedures are necessary to complete of a single piece of equipment, and if one of the construction procedures is changed, it is difficult to reflect an influence generated by the change on the other construction procedures. This may make operations less efficient.

As described above, Japanese Laid-Open Patent Application, Publication No. 2002-266498 allows an easy understanding of a change in the construction state with a passage of time. In the technique, however, if a user wants to know, for example, whether or not a carry-in operation using a crane is possible at a specific time or period, the user is required to manually perform the following: make a construction state at the specific time displayed; and confirm whether or not the equipment has already arrived at a site, an area for temporary placement has already been secured, and the equipment can be carried in a carry-in target spot position in a building. The technique thus has a difficulty in drawing up a construction plan more efficiently.

SUMMARY OF THE INVENTION

In the conventional techniques as described above, a carry-in operation using a crane is conducted in coordination with other plural operations, and thus, there may be some cases in which implementation of the carry-in operation is difficult depending on situations of construction processes in the other operations. The conventional techniques may have a difficulty in making an entire construction work more efficiently.

In light of such circumstances, the present invention has been made in an attempt to support carry-in operation planning made by a user so as to make an entire construction work more efficient.

In the present invention, in order to make an entire construction work efficient, a candidate of a carry-in ready period, that is, a period during which a carry-in operation can be performed is calculated and is displayed based on a site arrival time schedule and a temporary placement time schedule of a carry-in target equipment, and a construction time schedule of a building.

Details of the present invention are described hereinafter.

BRIEF DESCRIPTION OF THE DRAWINGS

FIG. 7 is a diagram illustrating temporary placement periods of the equipment as the targets for carry-in operation planning in a temporary placement time schedule according to the embodiment.

FIG. 8 a diagram illustrating carry-in space available periods of the equipment as the targets for carry-in operation planning in a construction time schedule according to the embodiment.

BEST MODE FOR CARRYING OUT THE INVENTION

Next is described an embodiment for carrying out the invention (which is to be simply referred to as an "embodiment" hereinafter) with reference to related drawings.

In this embodiment, a candidate of a carry-in ready period can be obtained by providing a site arrival time extraction part, a temporary placement period extraction part, a carry-in space available period extraction part, and a carry-in available period calculation part. Therefore, a user can determine a time period in which a carry-in operation of equipment using a crane is conducted, or can check to see whether or not a change in other time schedules is necessary, using a plurality of time schedules such as a site arrival time schedule, a temporary placement time schedule, and a construction time schedule.

<<Configuration>>

Figure 1:
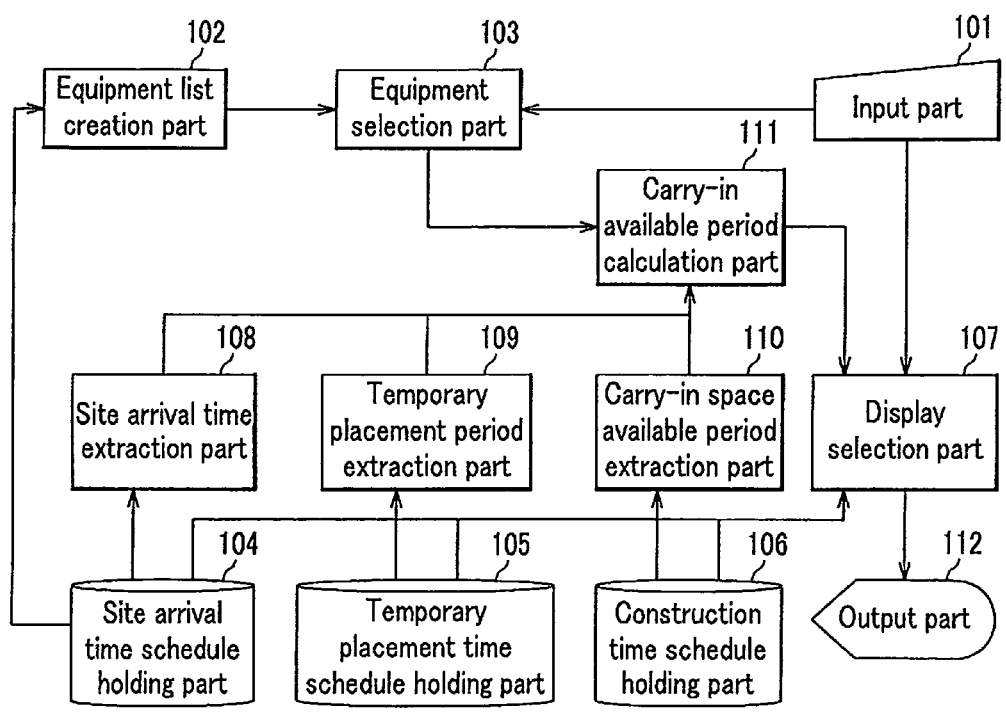
FIG. 1 is a block diagram illustrating a configuration of a system for supporting carry-in operation planning according to an embodiment of the present invention.

FIG. 1 is a block diagram illustrating a system for supporting carry-in operation planning in this embodiment. For convenience in explanation, the system for supporting carry-in operation planning may also be simply referred to as a "system". The system is a computer including an input part 101, an equipment list creation part 102, an equipment selection part 103, a site arrival time schedule holding part 104, a temporary placement time schedule holding part 105, a construction time schedule holding part 106, a display selection part 107, a site arrival time extraction part 108, a temporary placement period extraction part 109, a carry-in space available period extraction part 110, a carry-in ready period calculation part 111, and an output part 112. The system has a hardware configuration including an input unit (which corresponds to the input part 101), an output unit (which corresponds to the output part 112), a control unit (for example, a CPU (Central Processing Unit)), a storage unit (for example, a HDD (Hard Disk Drive), an auxiliary storage device, and a storage medium such as a ROM (Read Only Memory) and a RAM (Random Access Memory)). The control unit reads a program stored in the storage unit and executes a necessary processing, to thereby realize functions of the aforementioned software including the equipment list creation part 102, the equipment selection part 103, the site arrival time schedule holding part 104, the temporary placement time schedule holding part 105, the construction time schedule holding part 106, the display selection part 107, the site arrival time extraction part 108, the temporary placement period extraction part 109, the carry-in space available period extraction part 110, and the carry-in ready period calculation part 111.

The input part 101 is, for example, a keyboard or a mouse, with which a user enters a data. The input part 101 receives and transmits the data as an appropriate instruction input to the control unit of the system in other words, to the equipment selection part 103 and the display selection part 107.

The equipment list creation part 102 creates a list of carry-in target equipment used for carry-in operation planning, from among names of equipment recorded in the site arrival time schedule holding part 104 and transmits the created result, that is, an equipment list, to the equipment selection part 103.

The equipment selection part 103 selects one piece of the carry-in target equipment specified by the instruction input, based on the instruction input from the input part 101 and the equipment list inputted from the equipment list creation part 102. The equipment selection part 103 then transmits the selected result to the carry-in ready period calculation part 111.

The site arrival time schedule holding part 104 collectively holds at least information describing a site arrival time which is a time when a carry-in target equipment arrives at inside of a site from outside of the site for each of the equipment, as a site arrival time schedule; and transmits the information to a requestor on a request basis. The requestor is, for example, the equipment list creation part 102, the display selection part 107, and the site arrival time extraction part 108. The held data on the site arrival time schedule is, for example, previously entered by a user which may be acquired based on written materials or the like sent from operating bodies engaged in the plant construction.

The temporary placement time schedule holding part 105 collectively holds at least information describing a temporary placement period for each equipment, which is a period during which the each carry-in target equipment is temporarily placed in a site before finally carried-in, as a temporary placement time schedule; and transmits the information to a requestor on a request basis. The requestor is, for example, the display selection part 107 and the temporary placement period extraction part 109. The held data on the temporary placement period is, for example, previously entered by a user which may be acquired based on written materials or the like sent from operating bodies engaged in the plant construction.

The construction time schedule holding part 106 collectively holds at least information on, for example, carry-in target spot positions, time periods during which construction operations are conducted, and places as targets for the construction operations (for example, a floor or a wall such as a sidewall and an internal wall) of all of the carry-in target equipment in a building into which the carry-in target equipment is carried, as a construction time schedule; and transmits the information to a requestor on a request basis. The requestor is, for example, the display selection part 107 and the carry-in space available period extraction part 110. The held data on the construction time schedule is, for example, previously entered by a user which may be acquired based on written materials or the like sent from operating bodies engaged in the plant construction.

The display selection part 107 selects any one or more of the site arrival time schedule, the temporary placement time schedule, the construction time schedule, and the carry-in ready period, as display targets, based on the instruction input from the input part 101 and transmits the selected result to the output part 112. If a plurality of the display targets are selected, a plurality of times or periods of the display targets can be displayed in an overlapped manner, aligning respective time axes of the times or periods.

The site arrival time extraction part 108 extracts a site arrival time of the carry-in target equipment selected by the equipment selection part 103, from the site arrival time schedule held by the site arrival time schedule holding part 104 and transmits the extracted site arrival time to the carry-in ready period calculation part 111.

The temporary placement period extraction part 109 extracts a temporary placement period of the carry-in target equipment selected by the equipment selection part 103, from the temporary placement time schedule held by the holding part 105 and transmits the extracted temporary placement period to the carry-in ready period calculation part 111.

The carry-in space available period extraction part 110 acquires a carry-in target spot position of the carry-in target equipment selected by the equipment selection part 103, from the construction time schedule holding part 106. The carry-in space available period extraction part 110 then calculates a period during which a floor including the carry-in target spot position has already been constructed and a space above the carry-in target spot position is free and open, based on a time period during which a construction operation is performed and a place targeted for the construction operation, to thereby determine the period as a carry-in space available period and transmits the period to the carry-in ready period calculation part 111.

The carry-in ready period calculation part 111 acquires the site arrival time, the temporary placement period, and the carry-in space available period of the carry-in target equipment selected by the equipment selection part 103, from the site arrival time extraction part 108, the temporary placement period extraction part 109, and the carry-in space available period extraction part 110, respectively. The carry-in ready period calculation part 111 determines, from the acquired information, whether or not a period during which the carry-in target equipment can be carried in, that is, a carry-in ready period is present. The carry-in ready period calculation part 111 transmits the period, if any, or, if the period is not present, transmits a reason why the period is not present, to the display selection part 107.

The output part 112 is, for example, a display or a printer, and outputs the site arrival time schedule, the temporary placement time schedule, the construction time schedule, and the carry-in ready period inputted by the display selection part 107, to a user.

<<Acquisition of Carry-In Ready Period>>

Figure 2:
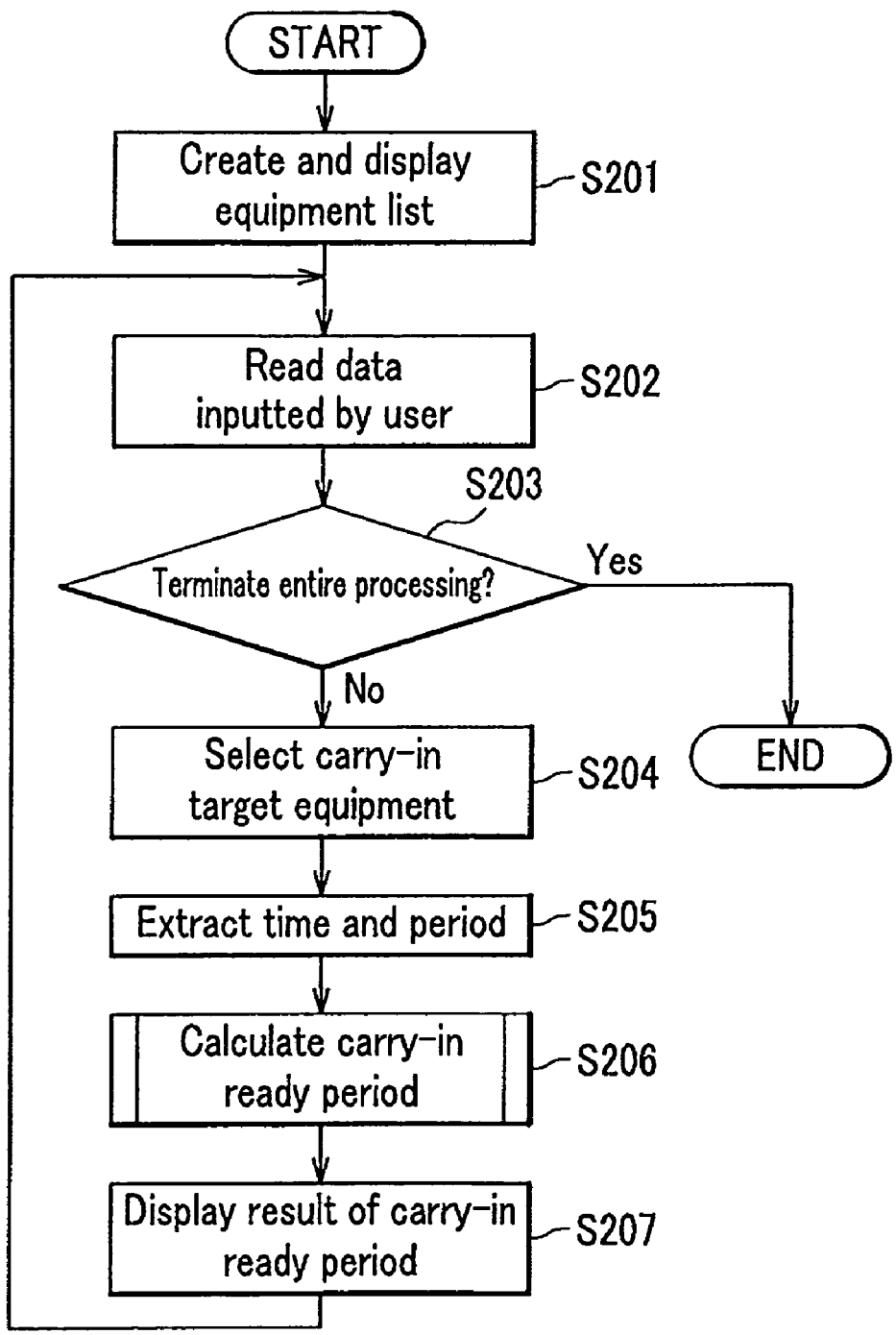
FIG. 2 is a diagram illustrating a flow of a processing in the system for supporting carry-in operation planning according to the embodiment.
Figure 3:
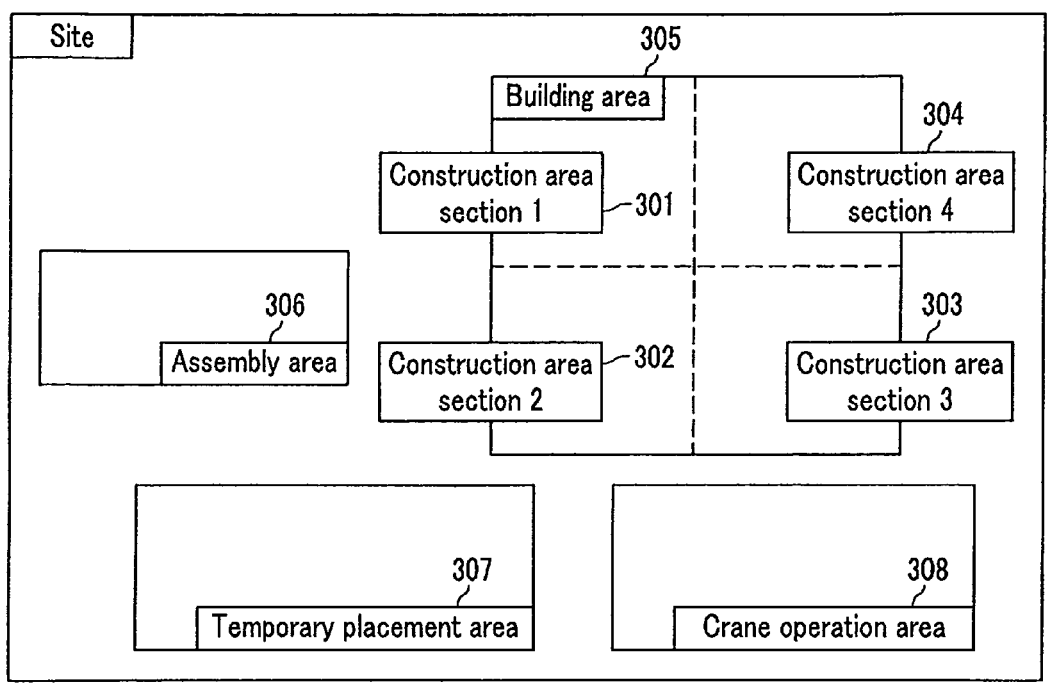
FIG. 3 is a diagram illustrating a layout of a site as a target for carry-in operation planning according to the embodiment.
Figure 4:
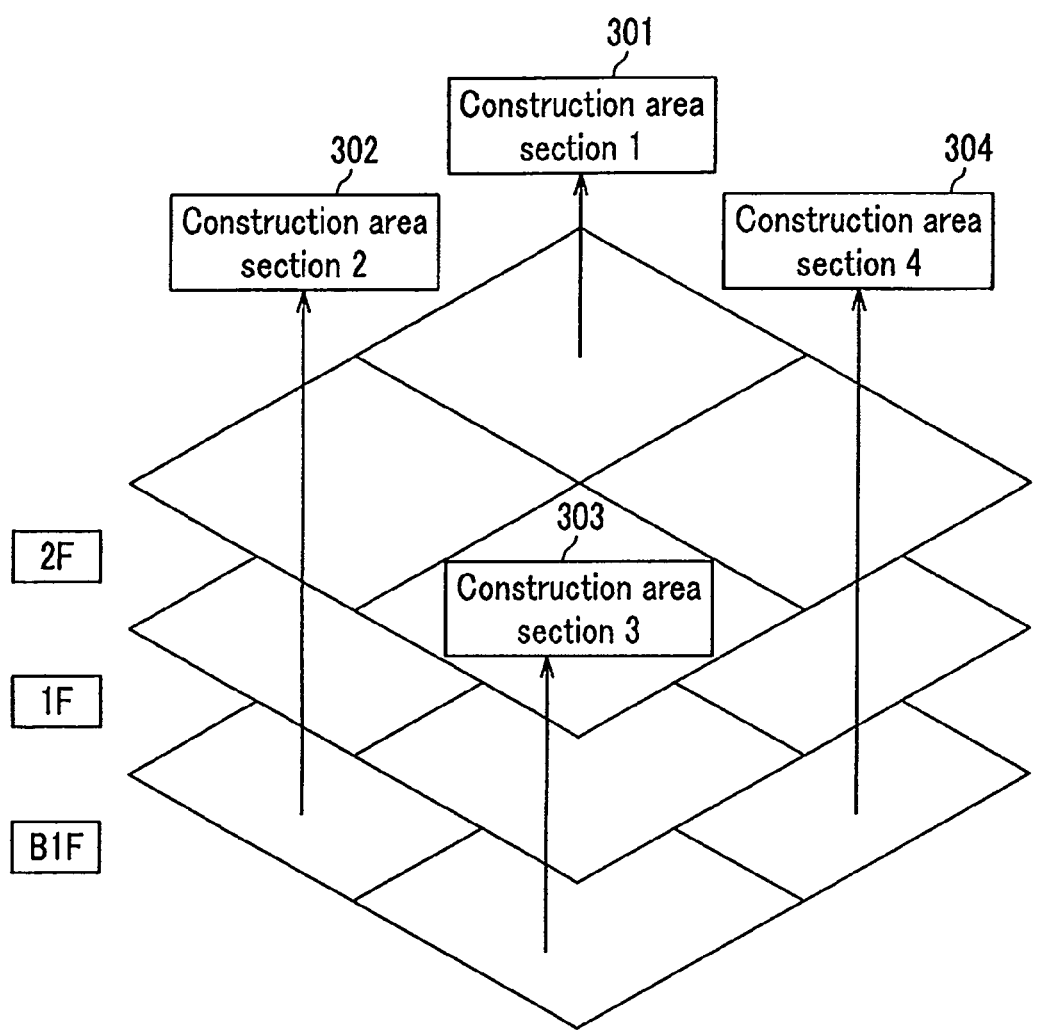
FIG. 4 is a diagram illustrating division of an interior of a building into construction area sections as the target for carry-in operation planning according to the embodiment.

An example of acquiring a carry-in ready period using the aforementioned system for supporting carry-in operation planning is described with reference to FIG. 2 to FIG. 11. FIG. 2 illustrates a flow of a processing in the system for supporting carry-in operation planning in this embodiment. FIG. 3 illustrates a layout of a site in the example. FIG. 4 illustrates division of an interior of a building into construction area sections.

As shown in FIG. 3, in the site, there is a building area 305 which is an area of the building as a target for the plant construction. The building area 305 is divided into a plurality of construction area sections so as to efficiently conduct construction operations. In this example, the building area 305 is divided into four construction area sections, namely, a construction area section 1 301, a construction area section 2 302, a construction area section 3 303, and a construction area section 4 304.

After transported from the outside, the carry-in target equipment may or may not be subjected to an assembly work before carried in the building area 305. Thus, an assembly area 306 for use in the assembly work is provided. A temporary placement area 307 is provided as an area for use in a temporary placement before the carry-in target equipment is finally carried in the building area 305. A crane operation area 308 is provided for use in operations of a crane if the crane conducts a carry-in operation.

Note that the building area 305 may be multi-storied. In this example, the building is three-storied from the first basement level to the second level above ground, as shown in FIG. 4. Respective construction area sections 1-4 include the same portions positioned vertically equally on the different levels. For example, the construction area section 1 301 represents the equally-positioned portions from the first basement level to the second level above ground. If a specific portion on a specific level, for example, a portion of the construction area section 1 301 on the second level above ground is referred to, the portion is represented as the construction area section 1-2F.

As shown in FIG. 2, the system for supporting carry-in operation planning according to this embodiment starts with performing step S201. In step S201, the equipment list creation part 102 acquires a site arrival time schedule from the site arrival time schedule holding part 104 and creates a list of equipment contained in the site arrival time schedule, as the carry-in target equipment. The created list is then made into an appropriate display form and is displayed, for example, on a display screen as the output unit.

Figure 5:
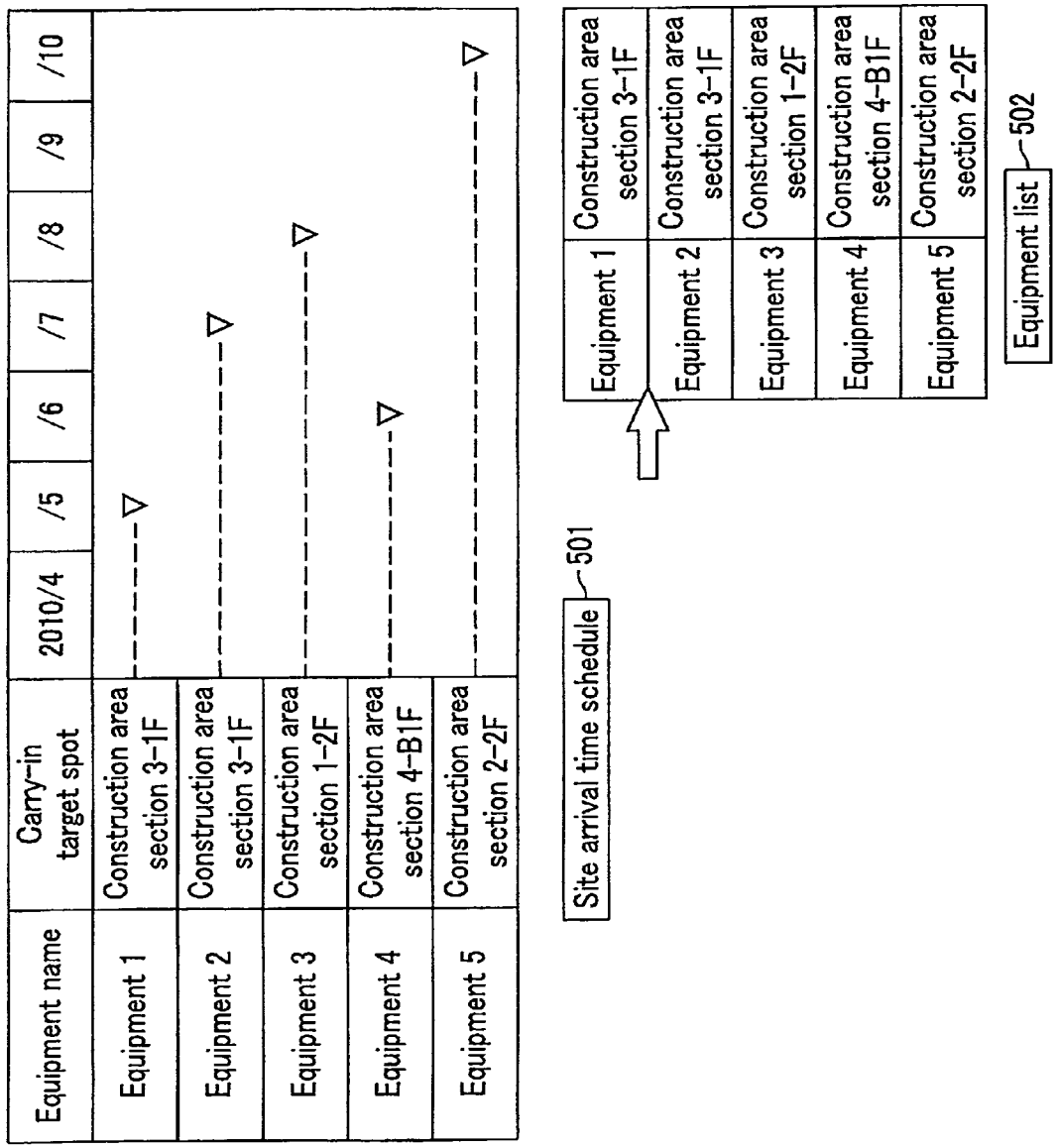
FIG. 5 is a diagram illustrating a site arrival time schedule of equipment and an equipment list according to the embodiment.

An example of the display form is shown in FIG. 5. The site arrival time schedule 501 held by the site arrival time schedule holding part 104 describes, for each equipment ("equipment name"), a carry-in target spot position of the equipment ("carry-in target spot"), and a time when the equipment arrives from the outside to the inside of a site (indicated by an inverted triangle). In this example, a carry-in target spot position is represented by a construction area section. The equipment list creation part 102 extracts the name and the carry-in target spot position of the equipment from the site arrival time schedule 501 to create an equipment list 502. The processing then advances to step S202.

In step S202, data inputted by a user is read from the input part 101, and the processing advances to step S203.

In step S203, it is determined whether or not the data inputted by the user represents a request of terminating the entire processing of the system for supporting carry-in operation planning according to this embodiment. If the data is a request of the termination (if "Yes" in step S203), the processing is terminated. If not (if "No" in step S203), the processing advances to step S204.

In step S204, based on the data inputted by the user from the input part 101, the equipment selection part 103 selects a carry-in target equipment of which carry-in ready period is a target to be acquired, from the equipment list 502 created by the equipment list creation part 102. The processing then advances to step S205.

Figure 6:
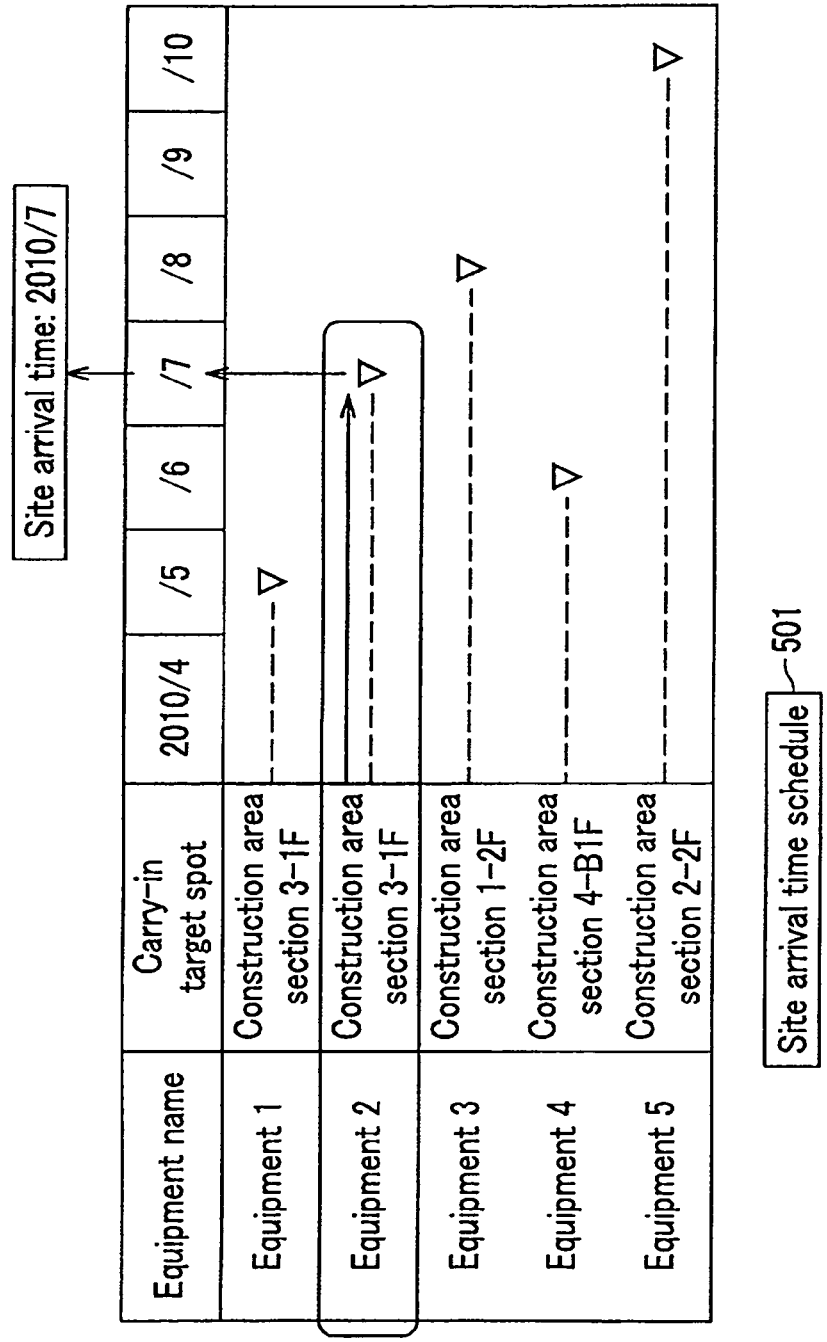
FIG. 6 is a diagram illustrating site arrival times of equipment as targets for carry-in operation planning in the site arrival time schedule according to the embodiment.

In step S205, a time and a period in connection with the carry-in target equipment selected in step S204 is acquired. Step 205 is exemplified with reference to FIG. 6, FIG. 7, and FIG. 8. It is assumed herein that the user has selected "equipment 2" as the carry-in target equipment in step S204. FIG. 6 illustrates a site arrival time of the equipment as a target for carry-in operation planning in the site arrival time schedule. FIG. 7 illustrates a temporary placement period schedule of the equipment as a target for carry-in operation planning in the temporary placement time. FIG. 8 illustrates a carry-in space available period of the equipment as a target for the carry-in operation planning in the construction time schedule.

In the site arrival time schedule 501 held by the site arrival time schedule holding part 104 of FIG. 6, the site arrival time of the equipment 2 is July 2010. The site arrival time extraction part 108 extracts a value of the site arrival time and transmits the value to the carry-in ready period calculation part 111. The site arrival time is herein indicated by an inversed triangle.

In the temporary placement time schedule 701 held by the temporary placement time schedule holding section 105 of FIG. 7, a period during which the equipment 2 is temporarily placed on the site is from July 2010 to October 2010. The temporary placement period extraction part 109 extracts a value of the temporary placement period and transmits the value to the carry-in ready period calculation part 111. Note that the temporary placement period is herein indicated by a thick black line. An assembly work of equipment conducted in the assembly area 306 (see FIG. 3) is regarded as part of an operation in the temporary placement time schedule 701. Alternatively, for example, a finish time of an assembly work can be regarded as a site arrival time.

In a construction time schedule 801 held by the construction time schedule holding part 106 of FIG. 8, a carry-in space available period is from October 2010 to November 2010 at the construction area section 3 303 on the first level (1F) to which the equipment 2 shown in the equipment list 502 is carried in. During the carry-in space available period, a carry-in operation can be done, that is, a floor on the first level has already been constructed while construction of a floor on the second level has not yet been started, and a space above the carry-in target spot position is free and open. The carry-in space available period extraction part 110 extracts a value of the carry-in space available period and transmits the value to the carry-in ready period calculation part 111. The processing then advances to step S206. Note that, in FIG. 8, a part to be constructed is managed with an item of "Category", such as "Floor" and "Wall". However, any other part may be shown as a part to be constructed. A period during which a floor is constructed is represented by a thick black line at an upper portion of each construction area section. A period during which a wall is constructed is represented by a thick black line at a lower portion of each construction area section. The carry-in space available period corresponds to a period during which a wall is being constructed, in other words, a period interposed between two adjacent periods during which floors are being constructed. Therefore, for convenience of explanation, the period during which a wall is being constructed may be simply regarded as a carry-in space available period. Note that, in general, a building is constructed in an order of: construction of a floor on a bottom level; construction of a wall (for example, a sidewall and an inner wall) and a carry-in of carry-in target equipment on the bottom level; construction of a floor on the second level from the bottom; and so on.

In step S206, a carry-in ready period is calculated based on the site arrival time, the temporary placement period, and the carry-in space available period inputted in step S205. An example of the calculation is described with reference to FIG. 9.

Figure 9:
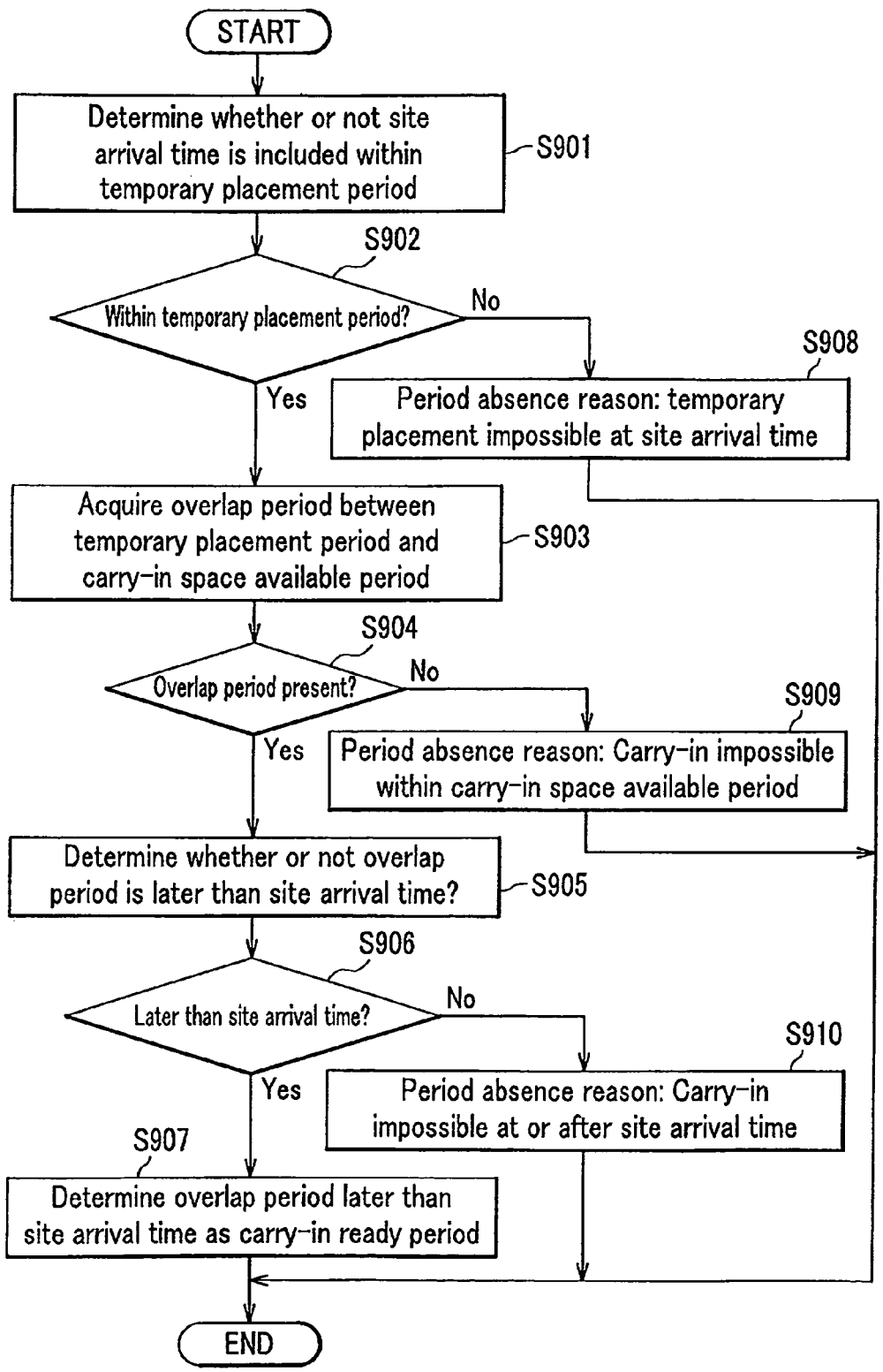
FIG. 9 is a diagram illustrating a flow of a processing of calculating a carry-in ready period according to the embodiment.

FIG. 9 illustrates a flow of a processing of calculating a carry-in ready period. The flow of the processing of FIG. 9 describes in detail step S206 of FIG. 2. The flow of the processing starts with step S901.

In step S901, the site arrival time acquired from the site arrival time extraction part 108 is compared to the temporary placement period acquired from the temporary placement period extraction part 109, to thereby determine whether or not the site arrival time is included within the temporary placement period. The processing then advances to step S902.

In step S902, if it is determined according to the comparison made in step S901 that the site arrival time is included within the temporary placement period (if "Yes" in step S902), the processing advances to step S903. And, if not (if "No" in step S902), the processing advances to step S908.

In step S903, an overlap period is calculated, if any, during which the temporary placement period is temporally overlapped with the carry-in space available period acquired from the carry-in space available period extraction part 110. The processing then advances to step S904.

In step S904, it is determined whether or not the overlap period is present based on the result calculated in step S903. If the overlap period is present (if "Yes" in step S904), the processing advances to step S905. And, if not (if "No" in step S904), the processing advances to step S909.

In step S905, it is determined whether or not the overlap period calculated in step S903 is temporally later than the site arrival time. The processing then advances to step S906.

In step S906, if it is determined according to the result obtained in step S905 that the overlap period is later the site arrival time (if "Yes" in step S906), the processing advances to step S907. And, if not (if "No" in step S906), the processing advances to step S910.

In step S907, a period after the site arrival time in the overlap period is determined as a carry-in ready period. The carry-in ready period is transmitted to the display selection part 107. Then the processing terminates.

In step S908, a message indicating that a temporary placement is impossible at the site arrival time is set as a reason why the carry-in ready period is not present. The message is, for example, "no temporary placement area is present when the carry-in target equipment arrives at the site". The message is transmitted to the display selection part 107. Then the processing terminates.

In step S909, a message indicating that a carry-in is impossible within the carry-in space available period is set as another reason why the carry-in ready period is not present. The message is, for example, "no temporary placement area for placing a carry-in target equipment is present within the carry-in space available period". The message is transmitted to the display selection part 107. Then the processing terminates.

In step S910, a message indicating that a carry-in is impossible after the site arrival is set as other reason why the carry-in ready period is not present. The message is, for example, "no carry-in possible state is present after the carry-in target equipment arrives at the site". The message is transmitted to the display selection part 107. Then the processing terminates. After the above-described steps shown in FIG. 9 are performed, in step S206, the processing advances to step S207.

Description of the processing is continued returning to FIG. 2. In step S207, the information inputted in the display selection part 107 is switched according to contents of the selection inputted by the user from the input part 101 and is outputted to the output part 112. This makes the calculated result of the carry-in ready period displayed on a screen. An example of the display is described with reference to FIG. 10.

Figure 10:
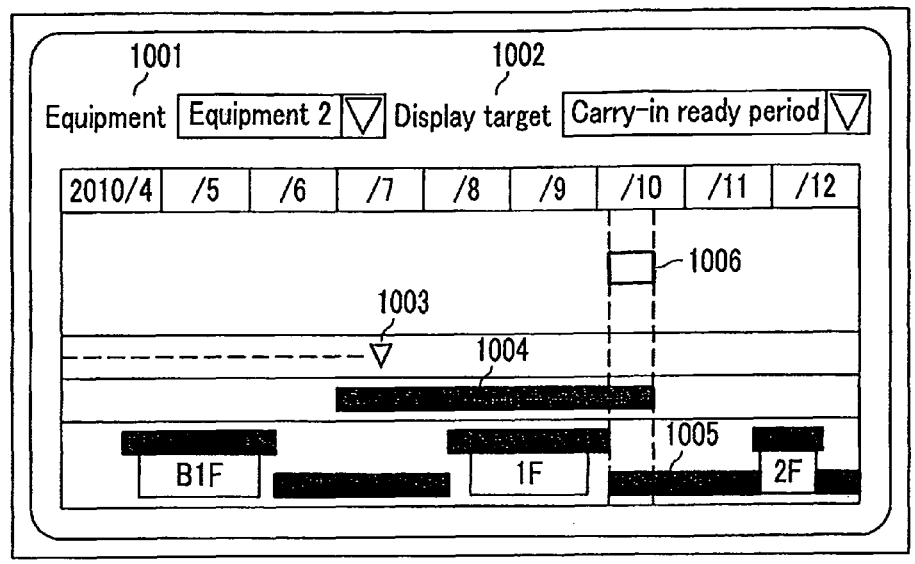
FIG. 10 is a diagram illustrating an exemplified screen display of an output part in a case where a carry-in ready period is present according to the embodiment.

FIG. 10 illustrates an exemplified screen display of the output part 112 in a case where a carry-in ready period is present. The user works with a calculation target equipment select list 1001 and a display target period list 1002 displayed on the screen of the output part 112 using the input part 101, to thereby set contents to be displayed. In this example, the user selects "equipment 2" in the calculation target equipment select list 1001 and "carry-in ready period" in the display target period list 1002. The set contents are transmitted to the display selection part 107. The screen of the output part 112 also displays a site arrival time 1003 of "equipment 2" inputted from the site arrival time extraction part 108, a temporary placement period 1004 of "equipment 2" inputted from the temporary placement period extraction part 109, and a carry-in space available period 1005 at an in-building carry-in target spot position of "equipment 2" inputted from the carry-in space available period extraction part 110.

The processing in this embodiment is performed in accordance with the above-described steps shown in FIG. 2 and FIG. 9, to thereby calculate a carry-in ready period. In this example, an overlap period is present, which is October 2010. That is, a period in and after July 2010 in which the carry-in target equipment arrives at the site and is also included in the temporary placement period which is from July to October 2010 is overlapped with the carry-in space available period which is from October to November 2010. The carry-in ready period calculation part 111 transmits the overlap period as a carry-in ready period to the display selection part 107. The display selection part 107 displays the carry-in ready period 1006 on a screen of the output part 112 because the carry-in ready period has been previously set as a display target.

Figure 11:
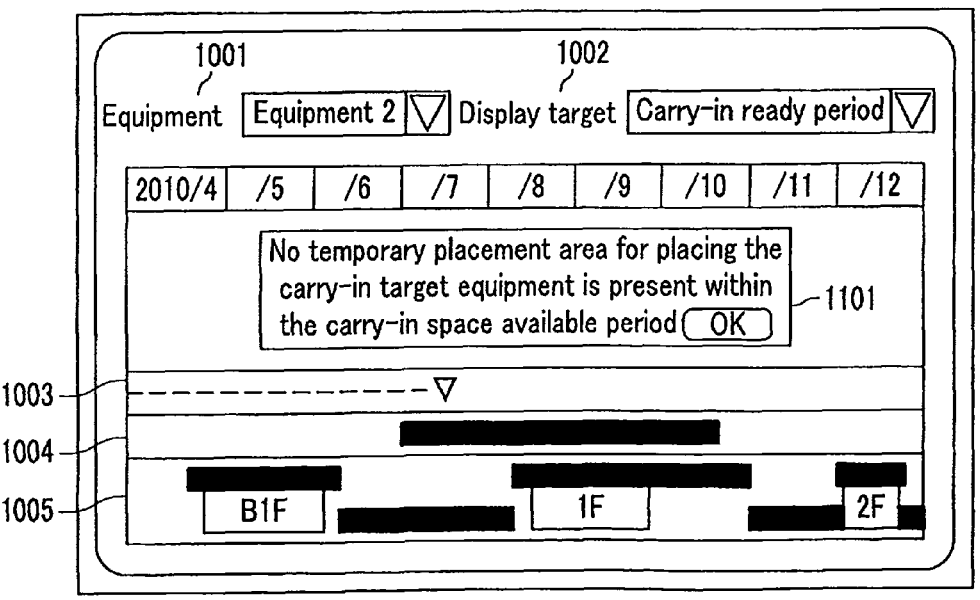
FIG. 11 is a diagram illustrating an exemplified screen display of the output part in a case where a carry-in ready period is not present according to the embodiment.

Another example is described with reference to FIG. 11. FIG. 11 illustrates an exemplified screen display of the output part 112 in a case where a carry-in ready period is not present. In this example, the construction time schedule 801 is updated, that is, a construction work of a floor on the first level at the construction area section 3 303 is prolonged, and a construction work of a wall on the first level and subsequent construction works are also put off. If the above-described processing is performed under this condition, in step S903, it is determined that the overlap period is not present. As the result determined in step S904, the processing advances to step S909. In step S909, a message saying that "No temporary placement area for placing the carry-in target equipment is present within the carry-in space available period" as a reason why the carry-in ready period is not present is transmitted to the display selection part 107. The message is accordingly displayed on the screen of the output part 112 as a period absence reason message 1101. Note that, if the period absence reason message 1101 is displayed to the user, it means that the carry-in ready period 1006 shown in FIG. 10 will not be present with a combination of the time schedules as they are now. Thus, in order to conduct a carry-in operation planning, the user updates any one or more of the arrival time schedule 501, the temporary placement time schedule 701, and the construction time schedule 801.

<<Update of Carry-In Ready Period; Shift of Temporary Placement Period>>

Figure 12:
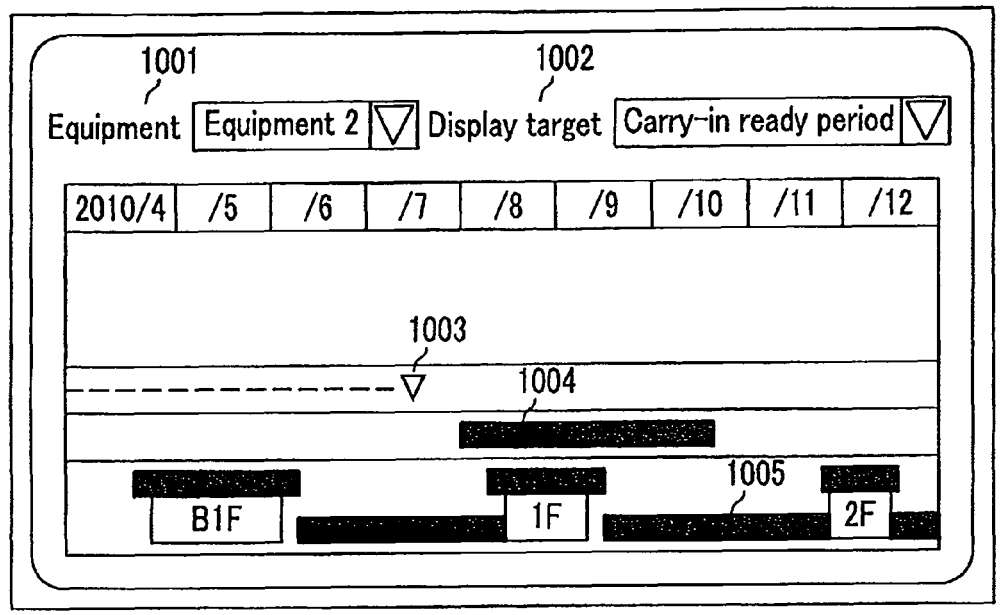
FIG. 12 is a diagram illustrating an exemplified screen display in which a site arrival time is not present within a temporary placement period according to the embodiment.
Figure 13:
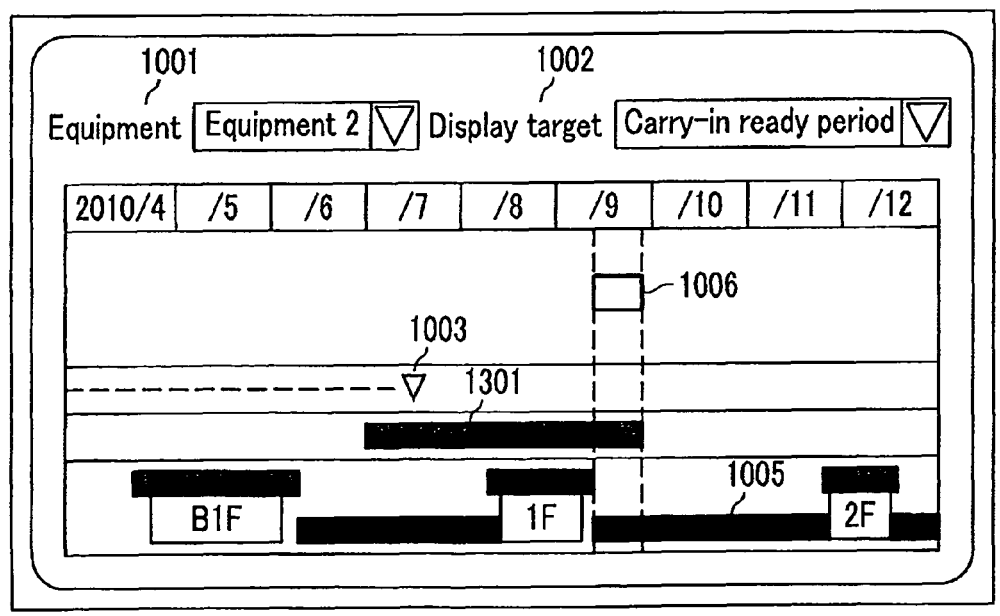
FIG. 13 is a diagram illustrating an exemplified screen display in which the temporary placement period is shifted to thereby generate a carry-in ready period according to the embodiment.
Figure 14:
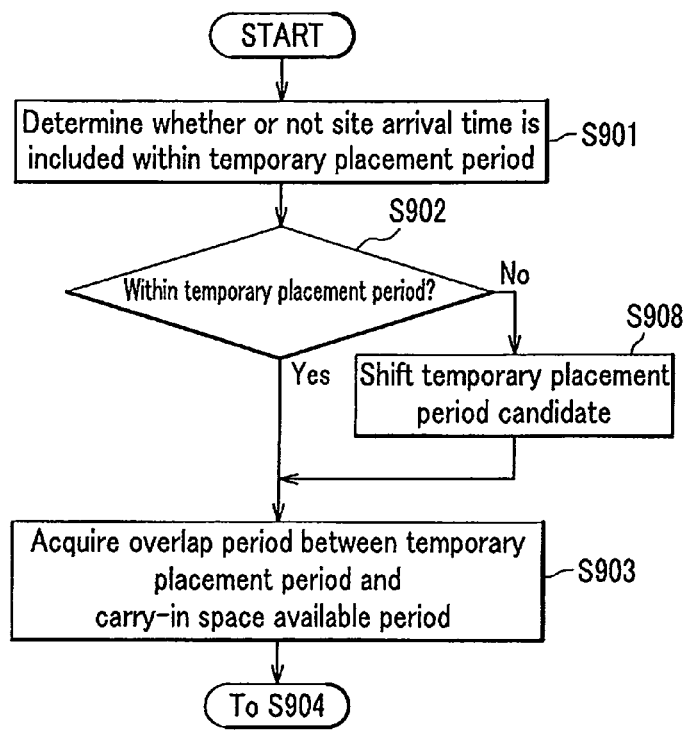
FIG. 14 is a diagram illustrating a portion of a processing flow for shifting the temporary placement period according to the embodiment.

Below is described an example in which, if the carry-in ready period 1006 is not present, the temporary placement period 1004 is shifted, and then, the carry-in ready period 1006 is recalculated, with reference to FIG. 12, FIG. 13, and FIG. 14. FIG. 12 illustrates an exemplified screen display in which a site arrival time is not present within a temporary placement period. FIG. 13 is an exemplified screen display in which the temporary placement period is shifted to thereby generate a carry-in ready period. FIG. 14 illustrates a portion of a processing flow for shifting the temporary placement period. Note that, if the temporary placement period 1004 shown in FIG. 12 is shifted, then the temporary placement period 1004 takes a value different from that described in the temporary placement time schedule 701. The temporary placement period 1004 having the different value after the shifting is referred to as a temporary placement period candidate 1301 so as to distinguish itself from the temporary placement period 1004 originally described in the temporary placement time schedule 701. After completing the processing shown in the example, if the user decides to use the temporary placement period candidate 1301 as the temporary placement period 1004 in an actual planning, the user updates the temporary placement time schedule 701 as appropriate.

In order to recalculate the carry-in ready period 1006 in the example, the processing shown in FIG. 9 is partly changed. The changed portion is shown in FIG. 14. FIG. 14 shows only step S901, step S902, step S903, and step S908 of the calculation processing of FIG. 9. Note that, in this example, processing contents and the next step to proceed of step S908 are updated.

In this example, as a result of the comparison performed in step S901, it is determined to be "No" in step S902 because the site arrival time 1003 is not present within the temporary placement period 1004 (see FIG. 12).

The processing then advances to step S908. In step S908, the temporary placement period 1004 is shifted, to thereby generate the temporary placement period candidate 1301. The processing advances to step S903. If the processing is performed in this way, the site arrival time 1003 is this time present within the temporary placement period candidate 1301. Thus, step S903 is performed in the same condition as that in which it is determined to be "Yes" in step S902.

As described above, FIG. 13 is the exemplified screen display of the output part 112 in a state where the temporary placement period 1004 is shifted to translate into the temporary placement period candidate 1301. The processing shown in FIG. 9 is performed in this state, and the carry-in ready period 1006 can be acquired. Note that the temporary placement period is shifted with or without change in length thereof. In order to acquire the carry-in ready period 1006, not only the temporary placement period 1004 but also at least one of the temporary placement period 1004 and the site arrival time 1003 may be shifted such that the site arrival time 1003 becomes present within the temporary placement period candidate 1301.

<<Update of Carry-In Ready Period; Shift of Carry-In Space Available Period>>

Figure 15:
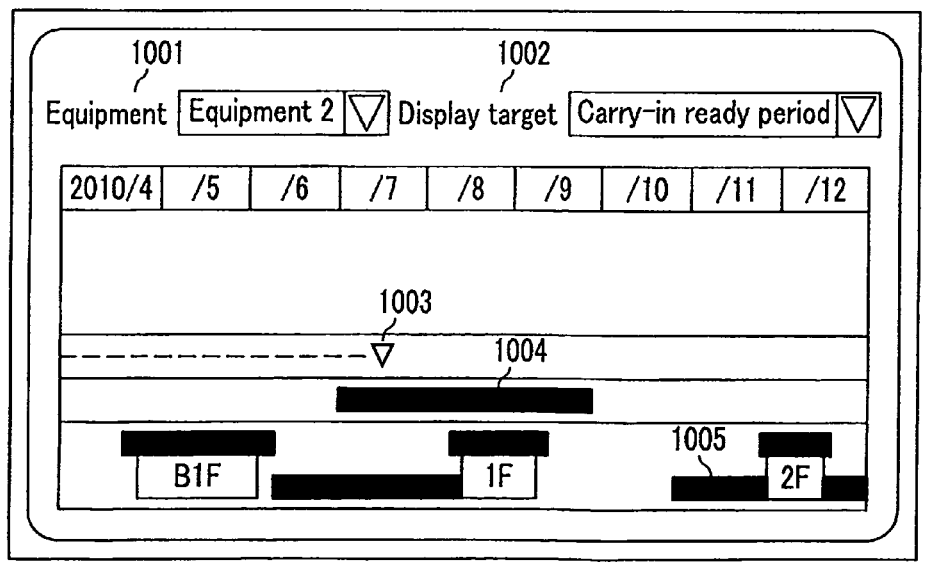
FIG. 15 is diagram illustrating an exemplified screen display in which an overlap period between a temporary placement period and a carry-in space available period is not present according to the embodiment.
Figure 16:
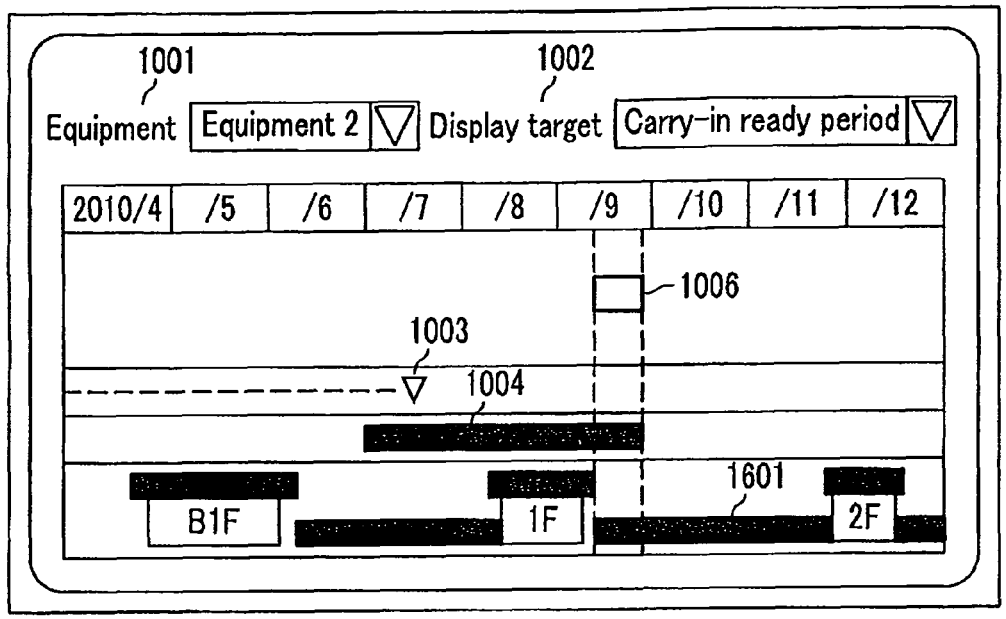
FIG. 16 is a diagram illustrating an exemplified screen display in which the carry-in space available period is shifted to thereby generate a carry-in ready period according to the embodiment.
Figure 17:
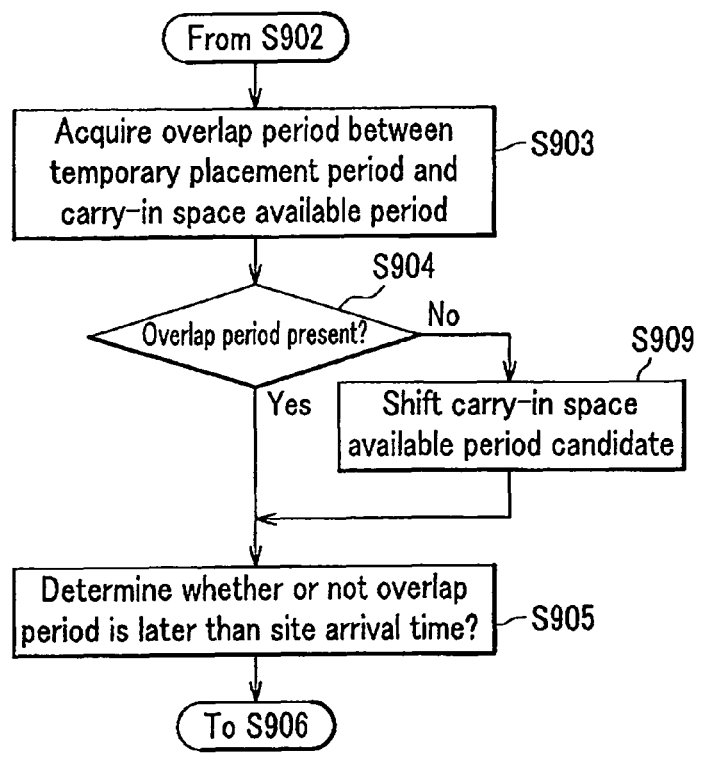
FIG. 17 is a diagram illustrating a portion of a processing flow for shifting the carry-in space available period according to the embodiment.

Below is described an example in which, if the carry-in ready period 1006 is not present, the carry-in space available period 1005 is shifted, and then, the carry-in ready period 1006 is recalculated, with reference to FIG. 15, FIG. 16, and FIG. 17. FIG. 15 illustrates an exemplified screen display in which an overlap period between a temporary placement period and a carry-in space available period is not present. FIG. 16 illustrates an exemplified screen display in which the carry-in space available period is shifted to thereby generate a carry-in ready period. FIG. 17 illustrates a portion of a processing flow for shifting the carry-in space available period. Note that, if the temporary placement period 1004 shown in FIG. 15 is shifted, then the carry-in space available period 1005 takes a value different from that described in the construction time schedule 801. The carry-in space available period 1005 having the different value after the shifting is referred to as a carry-in space available period candidate 1601 so as to distinguish itself from the carry-in space available period 1005 originally described in the construction time schedule 801. After completing the processing shown in the example, if the user decides to use the carry-in space available period candidate 1601 as the carry-in space available period 1005 in an actual planning, the user updates the construction time schedule 801 as appropriate.

In order to recalculate the carry-in ready period 1006 in the example, the processing shown in FIG. 9 is partly changed. The changed portion is shown in FIG. 17. FIG. 17 shows only step S903, step S904, step S905, and step S909 of the calculation processing of FIG. 9. Note that, in this example, processing contents and the next step to proceed of step S908 are updated.

In this example, as a result of the comparison performed in step S903, it is determined to be "No" in step S904 because an overlap period between the temporary placement period 1004 and the carry-in space available period 1005 is not present (see FIG. 15).

The processing then advances to step S90. In step S909, the carry-in space available period 1005 is shifted, to thereby generate the carry-in space available period candidate 1601. The processing advances to step S905. If the processing is performed in this way, the overlap period between the temporary placement period 1004 and the carry-in space available period 1005 is this time present. Thus, step S905 is performed in the same condition as that in which it is determined to be "Yes" in step S904.

As described above, FIG. 16 is the exemplified screen display of the output part 112 in a state where the carry-in space available period 1005 is shifted to translate into the carry-in space available period candidate 1601. The processing shown in FIG. 9 is performed in this state, and the carry-in ready period 1006 can be acquired. Note that the carry-in space available period is shifted with or without change in length thereof. In order to acquire the carry-in ready period 1006, not only the carry-in space available period 1005 but also at least one of the carry-in space available period 1005 and the temporary placement period 1004 may be shifted such that an overlap period is generated.

<<Update of Carry-In Ready Period; Shift of Site Arrival Time>>

Figure 18:
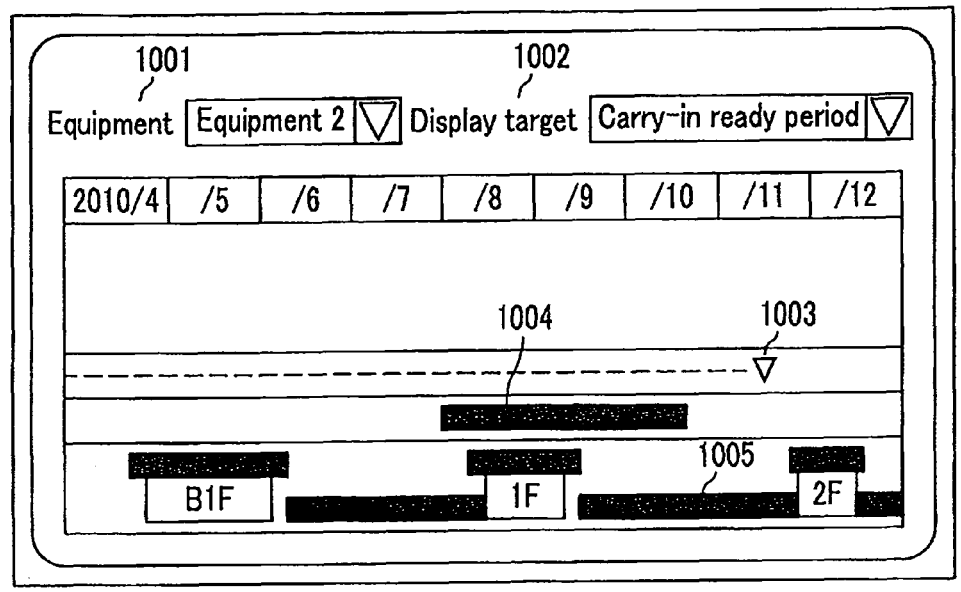
FIG. 18 is a diagram illustrating an exemplified screen display in which an overlap period between a temporary placement period and a carry-in space available period is earlier than a site arrival time according to the embodiment.
Figure 19:
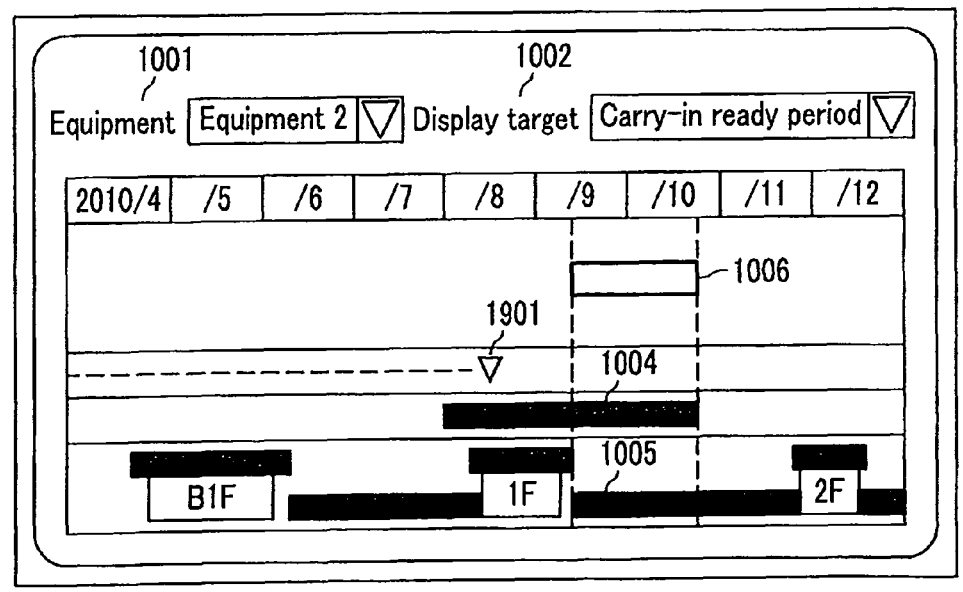
FIG. 19 is a diagram illustrating an exemplified screen display in which the site arrival time is shifted to thereby generate a carry-in ready period according to the embodiment.
Figure 20:
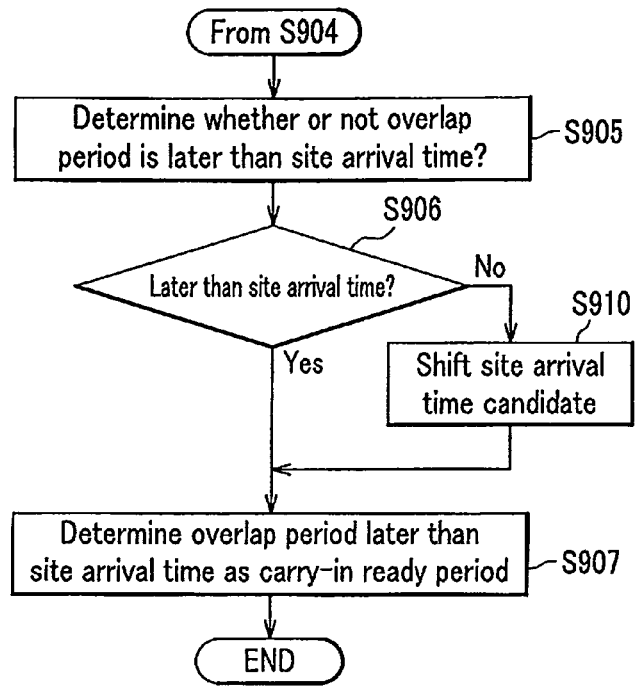
FIG. 20 is a diagram illustrating a portion of a processing flow for shifting the site arrival time according to the embodiment.

Below is described an example in which, if the carry-in ready period 1006 is not present, the site arrival time 1003 is shifted, and then, the carry-in ready period 1006 is recalculated, with reference to FIG. 18, FIG. 19, and FIG. 20. FIG. 18 illustrates an exemplified screen display in which an overlap period between a temporary placement period and a carry-in space available period is earlier than a site arrival time. FIG. 19 illustrates an exemplified screen display in which the site arrival time is shifted to thereby generate a carry-in ready period. FIG. 20 illustrates a portion of a processing flow for shifting the site arrival time. Note that, if the site arrival time 1003 shown in FIG. 18 is shifted, then the site arrival time 1003 takes a value different from that described in the site arrival time schedule 501. The site arrival time 1003 having the different value after the shift is referred to as a site arrival time candidate 1901 so as to distinguish itself from the site arrival time 1003 originally described in the site arrival time schedule 501. After completing the processing shown in the example, if the user decides to use the site arrival time candidate 1901 as the site arrival time 1003 in an actual planning, the user updates the site arrival time schedule 501 as appropriate.

In order to recalculate the carry-in ready period 1006 in the example, the processing shown in FIG. 9 is partly changed. The changed portion is shown in FIG. 20. FIG. 20 shows only step S905, step S906, step S907, and step S910 of the calculation processing of FIG. 9. Note that, in this example, processing contents and the next step to proceed of step S910 are updated.

In this example, as a result of the comparison performed in step S905, it is determined to be "No" in step S906 because an overlap period between the temporary placement period 1004 and the carry-in space available period 1005 is present before the site arrival time 1003 (see FIG. 18).

The processing then advances to step S910. In step S910, the site arrival time 1003 is shifted, to thereby generate the site arrival time candidate 1901. The processing advances to step S907. If the processing is performed in this way, the overlap period between the temporary placement period 1004 and the carry-in space available period 1005 is this time later than the site arrival time 1003. Thus, step S905 is performed in the same condition as that in which it is determined to be "Yes" in step S907.

As described above, FIG. 19 is the exemplified screen display of the output part 112 in a state where the site arrival time 1003 is shifted to translate into the site arrival time candidate 1901. The processing shown in FIG. 9 is performed in this state, and the carry-in ready period 1006 can be acquired. Note that the carry-in space available period is shifted with or without change in length thereof. In order to acquire the carry-in ready period 1006, not only the site arrival time 1003 but also at least one of the site arrival time 1003, the temporary placement period 1004, and the carry-in space available period 1005 may be shifted such that the site arrival time 1003 becomes earlier than the overlap period.

<<Recalculation of Carry-In Ready Period>>

Figure 21:
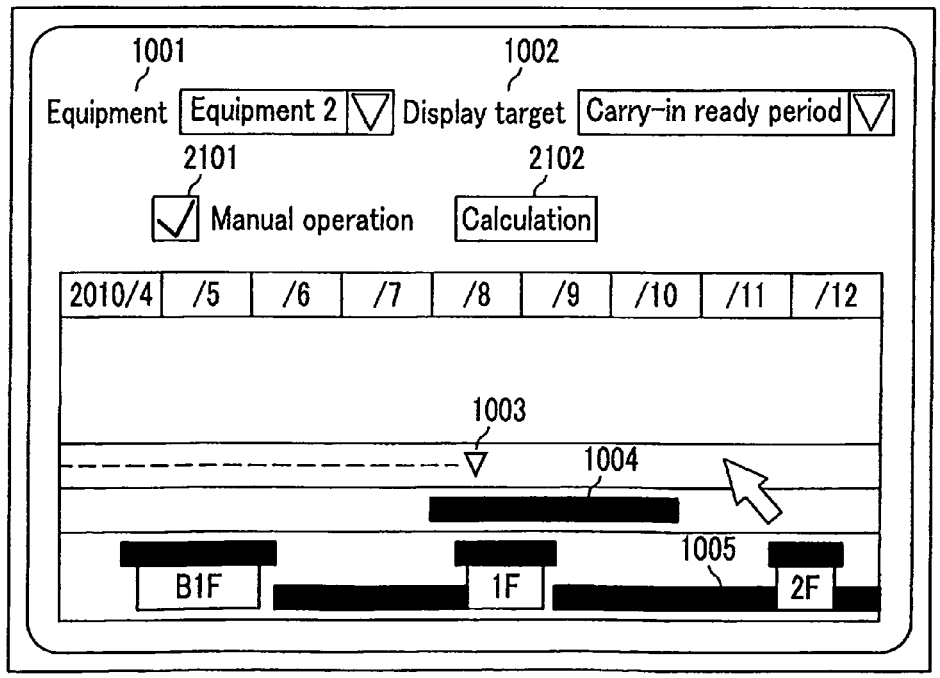
FIG. 21 is a diagram illustrating an example in which part or all of a site arrival time, a temporary placement period, and a carry-in space available period are updated according to an input from a user, based on which a carry-in ready period is recalculated, according to the embodiment.

Below is described, with reference to FIG. 21, an example in which part or all of the site arrival time 1003, the temporary placement period 1004, and the carry-in space available period 1005 are updated according to contents instructed by the user and read from the input part 101, based on which the carry-in ready period 1006 is recalculated. FIG. 21 illustrates an exemplified screen display on a screen of the output part 112.

The user moves a mouse cursor (in form of a white arrow in the figure) on the screen of the output part 112, using a mouse or the like of the input part 101. The user can enter data concerning a time, a period, and a time schedule by ticking a manual operation checkbox 2101 using the mouse.

For example, the user places and drags the mouse cursor over a figure displaying the site arrival time 1003, thus allowing the site arrival time 1003 to be shifted temporally forward or backward.

If the user drags a left end of a figure representing a prescribed period such as the temporary placement period 1004 and the carry-in space available period 1005, the period is extended backward to past time. And, if the user drags a right end thereof, the period is extended forward to future time.

Further, if the user drags a central portion of the figure, the period is shifted temporally forward or backward without changing a length thereof.

The user performs the above-mentioned operations to update the time or period and presses a calculation button 2102. This causes the processing explained with reference to FIG. 9 to be performed, to thereby calculate the carry-in ready period 1006. If the carry-in ready period 1006 is found to be present, a result obtained is displayed on the screen of the output part 112. On the other hand, if the carry-in ready period 1006 is not present, the reason is displayed. Alternatively, for example, the carry-in ready period 1006 may be automatically calculated upon the update of a time or a period, without providing the calculation button 2102.

<<Advantageous Effects>>

This embodiment has advantageous effects as follows. In the system for supporting carry-in operation planning according to this embodiment, a candidate of a carry-in ready period is calculated based on times and periods extracted from plural time schedules and coordinated with one another. This advantageously prevents possible reworks in carry-in operation planning works resulting from time schedules overlooked by users. Further, in the system, even if any of the plural time schedules is updated, a time or a period required for acquiring a carry-in ready period of a carry-in target equipment is calculated based on a time or a period extracted from an appropriate time schedule. This advantageously makes carry-in operation planning works efficient.

<<Modifications>>

The embodiment described above illustrates the best mode presently contemplated by the inventors for carrying out the present invention. However, the embodiment of the present invention is not limited to this, and various modifications and variations are possible without departing from the gist of the present invention.

For example, the carry-in ready period calculation part 111 of the system for supporting carry-in operation planning according to this embodiment can be applied to a use in which a user loads a carry-in plan made by other user, determines whether or not the carry-in ready period 1006 is present in each of equipment shown in the equipment list 502, and verifies effectiveness of the carry-in plan.

In this embodiment, if a carry-in ready period is not present, a site arrival time, a temporary placement period, or a carry-in space available period is shifted, to thereby create a carry-in ready period. In this case, a processing giving priority to an order of the shift may be performed in which is shifted first is set from among the site arrival time, the temporary placement period, and the carry-in space available period. For example, it is preferable to first shift the temporary placement period rather than the carry-in space available period. This is because the shift of the carry-in space available period involves a shift of the construction time schedule, and the construction time schedule typically has a larger influence on the entire construction works than the site arrival time schedule or the temporary placement time does.

In this embodiment, the carry-in operation planning in which an equipment is carried in using heavy machinery such as a crane has been explained. However, the carry-in operation planning in which an equipment is carried in without using heavy machinery or without being temporarily placed can also be created. The carry-in of an equipment without the temporary placement can be handled as a carry-in without a temporary placement period.

All or part of the hardware configuration of the system for supporting carry-in operation planning according to this embodiment can be replaced by a software configuration, and vice versa.

A technique using a suitable combination of various techniques described in this embodiment can also be realized.

Specific configurations of hardware, software, flowcharts and others in this embodiment can be modified where necessary without departing from the gist of the present invention.

In sum, the present invention can support carry-in operation planning made by a user so as to make the entire construction works efficient.

The invention claimed is:

1. A system for supporting carry-in operation planning for carrying one or more carry-in target equipment required for construction of a building, into the building, the system comprising:
   a storage unit constructed at least in part of memory hardware, configured to store therein:
      information which describes, for each of the carry-in target equipment, a site arrival time which is a period within which the carry-in target equipment is designated to arrive at a construction site, and a carry-in target spot designated for placement of the carry-in target equipment in the building,
      information which describes, for each of the carry-in target equipment, a temporary placement period which is a period during which the carry-in target equipment is designated to be temporarily placed in a temporary placement area differing from the carry-in target spot, and
      information which describes, for each of the carry-in target equipment, a carry-in space available period which is a period during which a floor representing the carry-in target spot in the building, has already been constructed and a space above the floor is free and open to accommodate movement of the carry-in target equipment; and
   a control unit constructed at least in part of processor hardware and configured to perform operations of:
      acquiring, from the storage unit, the site arrival time, the temporary placement period, and the carry-in space available period, of a specified carry-in target equipment specified by an input from the input unit, and,
      upon the conditions that: the site arrival time has at least an arrival time portion overlapping with the temporary placement period; the temporary placement period has at least a temporary placement time portion overlapping with the carry-in space available period; and a time of the arrival time portion is earlier than the temporary placement time portion, then determining the temporary placement time portion as a carry-in ready period of the specified carry-in target equipment, the carry-in ready period being a period during which the carry-in target equipment is designated to be carried from the temporary placement area to the carry-in target spot in the building.

2. The system for supporting carry-in operation planning according to claim 1,
   wherein, if the site arrival time of the specified carry-in target equipment does not at least partially overlap with the temporary placement period, the control unit is configured to effect operations of: shifting at least one of the site arrival time and the temporary placement period such that the site arrival time does at least partially overlap with the temporary placement period; and then generating the carry-in ready period.

3. The system for supporting carry-in operation planning according to claim 1,
   wherein, if the temporary placement time portion of the specified carry-in target equipment is not formed in that the temporary placement period does not at least partially overlap with the carry-in space available period, the control unit is configured to perform operation of: shifting at least one of the temporary placement period and the carry-in space available period to overlap such that the temporary placement time portion becomes formed; and then generating the carry-in ready period.

4. The system for supporting carry-in operation planning according to claim 1,
   wherein, if the arrival time portion of the specified carry-in target equipment is not earlier than the temporary placement time portion, the control unit is configured to perform operations of: shifting at least one of the site arrival time, the temporary placement period, and the carry-in space available period such that the arrival time portion becomes earlier than the temporary placement time portion; and then generating the carry-in ready period.

5. The system for supporting carry-in operation planning according to claim 1,
   wherein the control unit is configured to perform operations of: performs:
      shifting at least one of the site arrival time, the temporary placement period, and the carry-in space available period, according to an input from the input unit, and then calculating the carry-in ready period based on the site arrival time, the temporary placement period, and the carry-in space available period after the shifting.

* * * * *